(12) United States Patent
Takahashi et al.

(10) Patent No.: US 7,031,542 B2
(45) Date of Patent: Apr. 18, 2006

(54) ENCODING RATE CONTROLLING APPARATUS AND INFORMATION ENCODING APPARATUS

(75) Inventors: Tsutomu Takahashi, Tsurugashima (JP); Donghua Liu, Tsurugashima (JP); Yasuyuki Umehara, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 305 days.

(21) Appl. No.: 10/616,954

(22) Filed: Jul. 11, 2003

(65) Prior Publication Data

US 2004/0062306 A1    Apr. 1, 2004

Related U.S. Application Data

(63) Continuation of application No. 09/426,581, filed on Oct. 25, 1999, now Pat. No. 6,650,787.

(30) Foreign Application Priority Data

Oct. 23, 1998 (JP) ............................... P10-302294
Aug. 25, 1999 (JP) ............................... P11-237817

(51) Int. Cl.
*G06K 9/36* (2006.01)
*G06K 9/38* (2006.01)
*G06K 9/46* (2006.01)

(52) U.S. Cl. ...................... 382/251; 382/236; 382/238; 382/239; 382/248; 375/240.03; 375/240.16

(58) Field of Classification Search ................ 382/232, 382/236, 238, 239, 245–246, 248, 250–253; 375/240.1, 240.03, 240.16, 240.17, 240.25; 348/27, 387.1, 390.1, 407
See application file for complete search history.

(56) References Cited

U.S. PATENT DOCUMENTS

| 5,416,521 | A |   | 5/1995  | Chujoh et al.       |           |
|-----------|---|---|---------|---------------------|-----------|
| 5,719,986 | A | * | 2/1998  | Kato et al.         | 348/384.1 |
| 5,737,481 | A | * | 4/1998  | Gushima et al.      | 386/113   |
| 5,832,125 | A | * | 11/1998 | Reese et al.        | 382/239   |
| 6,044,115 | A | * | 3/2000  | Horiike et al.      | 375/240.05|

(Continued)

FOREIGN PATENT DOCUMENTS

EP    0 757 490 A2    2/1997

(Continued)

*Primary Examiner*—Kanjibhai Patel
*Assistant Examiner*—Ali Bayat
(74) *Attorney, Agent, or Firm*—Nixon & Vanderhye, PC

(57) ABSTRACT

The encoding rate controlling apparatus (9) is provided with a controlling device (9a, 9b) for performing a control for the encoding rate by changing a quantization scale code for quantizing the dynamic image information, and for conversing an average value of the encoding rate through all of the dynamic image information to an average value corresponding to a predetermined average value. The controlling device establishes on a time axis a plurality of change timings, each of which is a timing when the quantization scale code is changed, calculates the average value of the encoding rate corresponding to each of the established change timings, and performs the control for the encoding rate on the basis of the calculated average value. An information encoding apparatus (S) has the encoding rate controlling apparatus, a quantizing device (3) for quantizing the dynamic image information by using the changed quantization scale code, and an encoding device (5) for variable-length-encoding the quantized dynamic image information.

10 Claims, 11 Drawing Sheets

U.S. PATENT DOCUMENTS

| | | | |
|---|---|---|---|
| 6,061,404 A * | 5/2000 | Yonemitsu et al. | 375/242 |
| 6,167,087 A * | 12/2000 | Kato | 375/240.03 |
| 6,173,012 B1 * | 1/2001 | Katta et al. | 375/240.15 |
| 6,192,154 B1 * | 2/2001 | Rajagopalan et al. | 375/240.03 |
| 6,259,739 B1 * | 7/2001 | Kondo | 375/240.23 |
| 6,650,787 B1 | 11/2003 | Takahashi et al. | 382/251 |
| 6,697,567 B1 * | 2/2004 | Suzuki | 386/111 |

FOREIGN PATENT DOCUMENTS

| EP | 0 876 059 A2 | 11/1998 |
|---|---|---|

* cited by examiner

ENCODING RATE CONTROLLING APPARATUS AND INFORMATION ENCODING APPARATUS

This application is a continuation of application Ser. No. 09/426,581, filed Oct. 25, 1999, now U.S. Pat. No. 6,650,787.

BACKGROUND OF THE INVENTION

1. Field of the Invention

The present invention relates to an encoding rate controlling apparatus which controls an encoding rate when using a predetermined quantization scale code and then quantizing information and further encoding it, and an information encoding apparatus including the encoding rate controlling apparatus, and more particularly relates to an encoding rate controlling apparatus for controlling the encoding rate when carrying out the encoding while making the encoding rate variable, and an information encoding apparatus including the encoding rate controlling apparatus.

2. Description of the Related Art

There are various encoding methods for encoding information, especially, digital information and then recording it onto a record medium or transmitting it through a broadcast wave, for example. An MPEG method is one of them, which is used to record a dynamic image onto a DVD (i.e., an optical disk that increases a record capacity to about seven times that of a conventional CD (Compact Disk)) that has been recently put into a practical use.

Here, the MPEG method is an encoding technique which can compress image information originally having a large amount of information at a high efficiency by variable-length-encoding the information, which is obtained by performing a DCT (Discrete Cosine Transform) with respect to a difference between an image to be encoded and a reference image located on a time axis before or behind the image to be encoded and quantizing it, and a difference of moving vectors (each implying a vector indicative of a direction and an amount in a movement if there is any movement between the reference image and the image to be encoded) by a unit of a macro block (implying a square pixel block including pixels of 16 pixels×16 pixels in the image), and then transmitting or recording it.

By the way, when a simple image and a complex image are all compressed under the same compression rate at a time of compressing the images, for example, if it is the complex image, the excessive compression causes the image after the compression to be deteriorated.

Therefore, the MPEG method is constructed so as to use a so-called variable rate encoding manner and then make a compression rate variable for each image (namely, make an encoding rate variable) and accordingly carry out the encoding operation.

On the other hand, as a compression method using the variable rate encoding manner in the MPEG method, there are a manner referred to as a so-called two-times variable rate encoding manner and a manner referred to as a one-time variable rate encoding manner.

Here, the two-times variable rate encoding manner is the method of estimating a data generation amount (in other words, its quantization scale code) after respective encoding operations over all images to be encoded one time, and accurately controlling the encoding rate and the quantization scale code of each frame image at a second process, in accordance with the estimated data generation amount, and then carrying out the compression encoding optimal for the complexity of each image.

This two-times variable rate encoding manner can obtain the data generation amount in advance. Thus, if an image is compressed and encoded to a predetermined data amount, the optimal encoding rate and quantization scale code can be always calculated to thereby compress and encode to an image having a high image quality.

On the other hand, at first, the one-time variable rate encoding manner tentatively establishes an original quantization scale code of an image by using a predetermined method, and then starts the operations of quantizing and encoding the image by using the tentatively-established quantization scale code. Then, this manner sequentially calculates the average value of the encoding rate changed on the basis of the data generation amounts after the encoding of the respective images generated after the start of the operations (at this stage, even if the data generation amount of the image is changed, since the corresponding quantization scale code is constant, the corresponding encoding rate is also changed), and then compares this average value with a predetermined threshold. If the average value is greater, this manner determines that the data generation amount is excessive, and thereby increases the quantization scale code, and accordingly controls so as to reduce the average value. On the other hand, if the average value is smaller, it determines that the data generation amount is too small, and thereby decreases the quantization scale code, and accordingly carries out a process of increasing the average value.

This one-time variable rate encoding manner can compress and encode an input image to be encoded in a real time (namely, the input image can be compressed and encoded in an input order in the real time without analyzing the input image a plurality of times).

However, the above mentioned two-times variable rate encoding manner needs to analyze in advance the respective images to be encoded one time. This results in a problem that it is not suitable for the compression and the encoding in the real time.

On the other hand, the one-time variable rate encoding manner has the following problem. That is, the image quality is extremely dropped if a value of a quantization scale code tentatively established at an initial time of starting the compression and the encoding does not agree with a performance of an actual image although the compression and the encoding are possible in the real time (for example, in a series of images to be encoded, although there is not a substantial movement within the image in the vicinity of the lead thereof, if the movement within the image is suddenly increased by a scene change and the like).

SUMMARY OF THE INVENTION

The present invention is proposed in view of the above mentioned problems. It is therefore an object of the present invention to provide an encoding rate controlling apparatus which can restrict a deterioration of an information quality even if an encoding is carried out in a real time, and an information encoding apparatus having such an encoding rate controlling apparatus.

The above object of the present invention can be achieved by a first encoding rate controlling apparatus for controlling an encoding rate when quantizing and encoding dynamic image information composed of a dynamic image. The first encoding rate controlling apparatus is provided with a controlling device such as a rate controller etc., for performing a control for the encoding rate by changing a quantization scale code for quantizing the dynamic image information, and for converging an average value of the encoding rate through all of the dynamic image information to an average value corresponding to a predetermined average value. The controlling device establishes on a time axis a plurality of change timings, each of which is a timing when the quantization scale code is changed, calculates the average value of the encoding rate corresponding to each of the established change timings, and performs the control for the encoding rate on the basis of the calculated average value.

According to the first encoding rate controlling apparatus of the present invention, since the control for the encoding rate is performed on the basis of the average value of the encoding rate for each of the change timings, it is possible to surely converge the encoding rate to the average value corresponding to the predetermined average value. Thus, it is possible to encode the dynamic image information while restricting or minimizing a deterioration of an information quality.

Therefore, even if the dynamic image information is encoded in a real time, it is still possible to encode it while restricting or minimizing the deterioration of the information quality.

In one aspect of the first encoding rate controlling apparatus of the present invention, the controlling device is provided with: a judging device such as a CPU etc., for dividing in advance a value, which the encoding rate can take for each of the established change timings, into a plurality of rate ranges, and judging one of the rate ranges to which the average value of the encoding rate belongs; and a changing device such as a CPU etc., for changing the quantization scale code in correspondence with the judged one of the rate ranges, so as to perform the control for the encoding rate.

According to this aspect, since one of the rate ranges to which the average value belongs is judged and the quantization scale code is changed on the basis of this judgment result, it is possible to surely converge the encoding rate to the average value within the range corresponding to the predetermined average value by employing a relatively simple configuration.

In this aspect, each line, which connects boundary values of the rate ranges for each of the established change timings, for corresponding each of the boundary values may be a curve converged to the predetermined average value.

By constructing in this manner, it is possible to perform the control for the encoding rate while preventing the encoding rate from being drastically changed.

In another aspect of the first encoding rate controlling apparatus of the present invention, the average value of the encoding rate is an average value from a start time point of encoding the dynamic image information until a current time point of the change timing.

According to this aspect, since the encoding rate is controlled by using the average value of the encoding rate from the start time point of encoding the dynamic image information until the current time point of the change timing, it is possible to more surely converge the encoding rate to the average value corresponding to the predetermined average value.

In another aspect of the first encoding rate controlling apparatus of the present invention, the change timings are established at a dense time interval in a former stage and a latter stage of the dynamic image information and are established at a sparse time interval in a middle stage of the dynamic image information which is between the former stage and the latter stage.

According to this aspect, it is possible to surely converge the encoding rate to the average value corresponding to the predetermined average value while reducing a processing load at the time of controlling.

In another aspect of the first encoding rate controlling apparatus of the present invention, the controlling device changes the quantization scale code on the basis of an encoding rate difference, which is a difference between the encoding rates in two of the change timings adjacent to each other.

According to this aspect, since the quantization scale code is changed to be set on the basis of the encoding rate difference at the two change timings, an unnecessary change of the quantization scale code can be avoided and it is possible to surely converge the encoding rate to the average value corresponding to the predetermined average value.

The above object of the present invention can be also achieved by a second encoding rate controlling apparatus for controlling an encoding rate when quantizing and encoding dynamic image information composed of a dynamic image. The second encoding rate controlling apparatus is provided with: a first controlling device such as a first controller etc., for performing a first control for the encoding rate when encoding former information, which is the dynamic image information inputted between a start time point of an input of the dynamic image information to be encoded and a predetermined first time point; and a second controlling device such as a second controller etc., for performing a second control, which is different from the first control, for the encoding rate when encoding later information, which is the dynamic image information inputted after the former information, on the basis of a result of the first control, and for converging an average value of the encoding rate through all of the dynamic image information to an average value corresponding to a predetermined average value.

According to the second encoding rate controlling apparatus of the present invention, since the encoding rate as for encoding one dynamic image information is finally converged to the average value corresponding to the predetermined average value by the double stage control i.e., the first control for the former information and the second control for the later information, it is possible to encode the dynamic image information while restricting or minimizing a deterioration of an information quality.

Therefore, even if the dynamic image information is encoded in a real time, it is still possible to encode it while restricting or minimizing the deterioration of the information quality.

In one aspect of the second encoding rate controlling apparatus of the present invention, the first controlling device and the second controlling device control the encoding rate while changing a generation encoding amount by changing a quantization scale code when respectively quantizing the former information and the later information.

According to this aspect, it is possible to efficiently control the encoding rate.

In this aspect, a plurality of change timings, each of which is a timing when the quantization scale code is changed, may be established on a time axis. The first controlling device may calculate a first average value of the encoding rate between a current change timing, which is one of the change timings at present time, and an immediately-before change timing, which is one of the change timings immediately before the current change timing, and may perform the first control on the basis of the first average value. The second controlling device may calculate a second average value of the encoding rate from a start time point of encoding the dynamic image information until the current change timing, and may perform the second control on the basis of the second average value.

By constructing in this manner, since the control is performed by using the first average value at the time of the first control and is performed by using the second average value at the time of the second control, it is possible to control the encoding rate by using a relatively simple process at the time of the first control and it is possible to surely converge the encoding rate to the average value corresponding to the predetermined average value by the second control.

In this case, the first controlling device may be provided with: a first judging device such as a CPU etc., for dividing in advance a value, which the encoding rate can take for each of the established change timings, into a plurality of first rate ranges, and judging one of the first rate ranges to which the first average value belongs; and a first changing device such as a CPU etc., for changing the quantization scale code in correspondence with the judged one of the first rate ranges, so as to perform the first control. The second controlling device may be provided with: a second judging device such as a CPU etc., for dividing in advance a value, which the encoding rate can take for each of the established change timings, into a plurality of second rate ranges different from the first rate ranges, and judging one of the second rate ranges to which the second average value belongs; and a second changing device such as a CPU etc., for changing the quantization scale code in correspondence with the judged one of the second rate ranges, so as to perform the second control.

By constructing in this manner, since one of the second rate rage to which the second average value belongs is judged from the second rate ranges different from the first rate ranges used for the first control and the quantization scale code is changed on the basis of this judgment result, it is possible to surely converge the encoding rate to the average value corresponding to the predetermined average value by changing the quantization scale code by using the rate ranges different for each control.

In this case further, each line, which connects boundary values of the first rate ranges for each of the established change timings, for corresponding each of the boundary values may be a straight line, and each line, which connects boundary values of the second rate ranges for each of the established change timings, for corresponding each of the boundary values may be a curve converged to the predetermined average value.

By constructing in this manner, it is possible to perform the first control by using a relatively simple process, and it is possible to perform the second control while preventing the encoding rate from being drastically changed.

Alternatively, in the above mentioned case that a plurality of change timings are established, the change timings corresponding to the former information may be established at a constant time interval, and the change timings corresponding to the later information may be established at a dense time interval in a former stage and a latter stage of the later information and are established at a sparse time interval in a middle stage of the later information, which is between the former stage and the latter stage.

By constructing in this manner, it is possible to control the encoding rate by using a relatively simple process at the time of the first control, and it is possible to surely converge the encoding rate to the average value corresponding to the predetermined average value while reducing a processing load at the time of the second control.

Alternatively, in the above mentioned one aspect in which the first and second controlling device control while changing the generation encoding amount, the second controlling device may perform the second control such that a value of the quantization scale code is changed to be within a range between a minimum and a maximum of the quantization scale code which are set in advance.

By constructing in this manner, since the value of the quantization scale code is changed to be within the range between the minimum and the maximum of the quantization scale code set in advance, it is possible to more appropriately control the encoding rate.

In another aspect of the second encoding rate controlling apparatus of the present invention, the first controlling device and the second controlling device perform the first control and the second control respectively such that the encoding rate is changed to be within a range not exceeding a maximum value of the encoding rate set in advance.

According to this aspect, such a problem that an encoding process exceeding a transfer speed (i.e., a recording speed) onto a record medium, for example, since the encoding rate exceeds the maximum value thereof can be prevented.

In another aspect of the second encoding rate controlling apparatus of the present invention, the dynamic image information is encoded while evaluating an accumulated information amount in a memory which is used for decoding the encoded dynamic image information.

According to this aspect, since the encoding process is performed while the accumulated information amount in the memory used for decoding is evaluated, it is possible to prevent the memory from being over-flown or under-flown at the time of decoding the dynamic image information, and it is possible to perform an encoding process which allows a stable decoding process.

The above object of the present invention can be also achieved by an information encoding apparatus provided with (i) the above described first or second encoding rate controlling apparatus of the present invention, (ii) a quantizing device such as a quantization unit etc., for quantizing the dynamic image information by using the changed quantization scale code, and (iii) an encoding device such as a variable length encoder etc., for variable-length-encoding the quantized dynamic image information.

According to the information encoding apparatus of the present invention, by converging the encoding rate sequentially to the average value corresponding to the predetermined average value, it is possible to encode the dynamic image information while restricting or minimizing a deterioration of an information quality.

In one aspect of the information encoding apparatus of the present invention, the encoding device performs a compression-encoding process based on an MPEG 2 (Moving Picture Expert Group 2) method with respect to the dynamic image information by using the encoding rate.

According to this aspect, it is possible to compress and encode the dynamic image information while restricting or minimizing a deterioration of an information quality.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENT

Preferred embodiments of the present invention will be explained below with reference to the drawings. The following embodiments are the embodiments in which the present invention is applied to an encoding apparatus for compressing and encoding a dynamic image in accordance with an MPEG2 method among the above-mentioned MPEG methods.

Figure 1A:
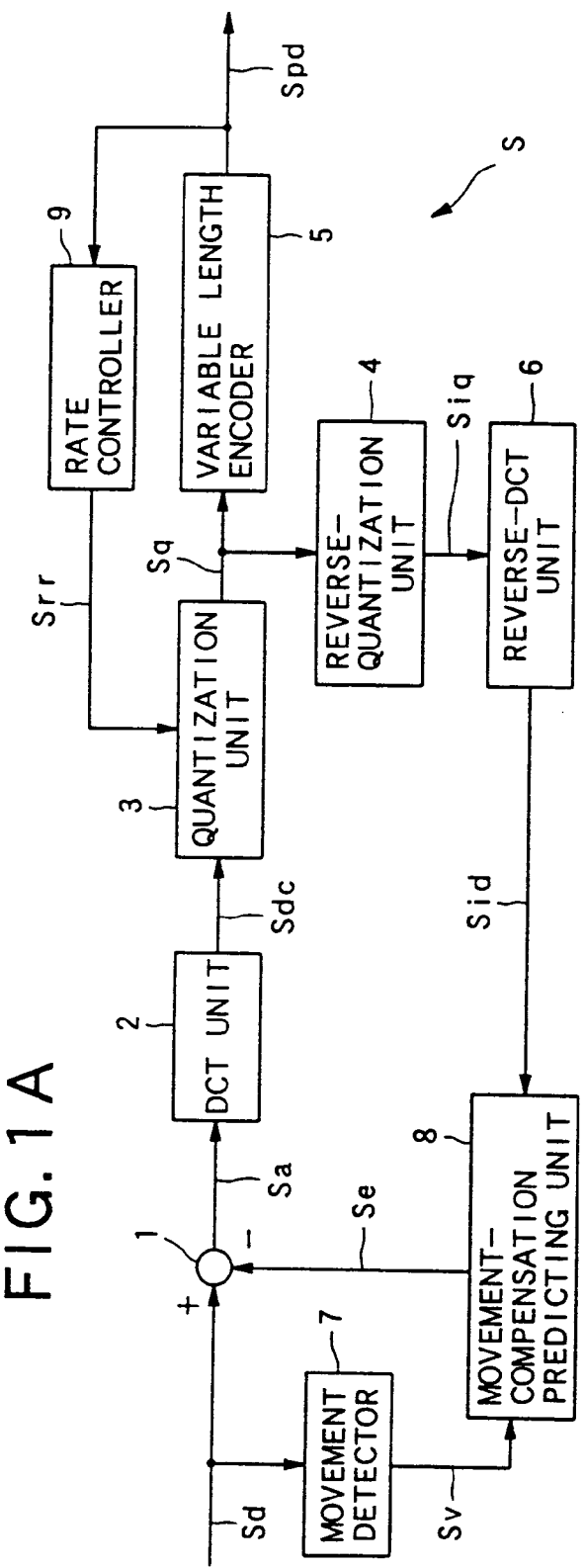
FIG. 1A is a block diagram showing a whole configuration of an encoding apparatus in an embodiment of the present invention.
Figure 1B:
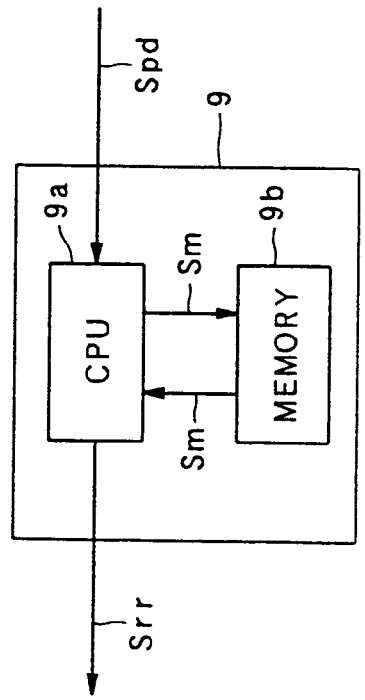
FIG. 1B is a block diagram showing a detailed configuration of a rate controller in the encoding apparatus of the embodiment.

At first, the configuration and the schematic operation of an encoding apparatus according to the embodiment are described with reference to FIGS. 1A and 1B. FIGS. 1A and 1B are block diagrams showing the schematic configuration of the encoding apparatus.

As shown in FIG. 1A, an encoding apparatus S in the embodiment is provided with an adder 1, a DCT unit 2, a quantization unit 3 serving as a quantizing device, a reverse-quantization unit 4, a variable length encoder 5 serving as an encoding device, a reverse-DCT unit 6, a movement detector 7, a movement-compensation predicting unit 8, and a rate controller 9 serving as a first control device, a second control device and a control device according to the present invention.

As shown in FIG. 1B, the rate controller 9 is provided with a memory 9b and a CPU 9a serving as a judging device, a first judging device, a second judging device, a changing device, a first changing device and a second changing device.

Next, the schematic operation of the encoding apparatus S will be described below with reference to FIGS. 1A and 1B.

As shown in FIGS. 1A and 1B, a digital information signal Sd (image information in this digital information signal Sd is composed of a plurality of frame images and digitized for each pixel constituting respective one of the frames) which is inputted from the external potion to the encoding apparatus S is inputted to the movement detector 7 and also inputted to the adder 1.

Then, the movement detector 7 calculates the movement vector for each frame within the digital information signal Sd, and outputs a corresponding vector signal Sv to the movement-compensation predicting unit 8.

The movement vector is described in detail. Namely, the movement vector is used for a movement compensation process executed at a time of compressing a dynamic image in accordance with the MPEG2 method.

That is, according to the movement-compensation process by the movement compensation predicting unit 8, an image to be encoded is firstly divided into the macro blocks each including pixels of predetermined number. Then, the absolute values of differences between respective pixels within the respective macro blocks and the corresponding pixels within one frame before or after on a time axis are added as for all the pixels within the macro blocks. Then, a spatial position of an image having the minimum sum in the added absolute values (i.e., the image which is the closest to the image within the macro block and which is within one frame before or after on the time axis) is determined.

Then, a movement relation between the macro block and the image closest to the macro block is assumed to be the movement vector. This movement vector is encoded as information indicative of the image within the one frame before or after on the time axis. Accordingly, the amount of the actually-encoded information can be significantly compressed over the case of encoding the image information itself as it is, so as to record the image information.

The adder 1 subtracts a compensation signal Se from the movement-compensation predicting unit 8, from the digital information signal Sd inputted to the adder 1. Then, the subtracted result is outputted to the DCT unit 2, as a subtraction signal Sa.

Then, the DCT unit 2 performs the DCT for compressing the amount of information, on the subtraction signal Sa, and then outputs it as a conversion signal Sdc to the quantization unit 3.

Then, the quantization unit 3 quantizes the conversion signal Sdc in accordance with a quantization scale code indicated by a later-described rate signal Srr, and generates a quantization signal Sq, and then outputs it to the variable length encoder 5 and the reverse-quantization unit 4 respectively.

Next, the reverse-quantization unit 4 performs a reverse-quantization process on the quantization signal Sq, and generates a reverse-quantization signal Siq, and then outputs it to the reverse-DCT unit 6.

Then, the reverse-DCT unit 6 performs a reverse-DCT (Reverse Discrete Cosine Transform) on the reverse-quantization signal Siq, and then outputs it as a reverse-conversion signal Sid to the movement-compensation predicting unit 8.

After that, in accordance with the reverse-conversion signal Sid and the movement vector included in the vector signal Sv, the movement-compensation predicting unit 8 carries out the movement compensation process by using a so-called inter-frame prediction in the MPEG2 method, and then generates the compensation signal Se for compressing the amount of information, and further outputs it to the adder 1.

On the other hand, the variable length encoder 5 performs a variable length encoding process on the quantization signal Sq, and then outputs a compression information signal Spd, in which the original digital information signal Sd is compressed and encoded by the MPEG2 method, to the rate controller 9 and an encoding buffer memory (not shown).

At this time, the rate controller 9 uses a later-described process of the present invention based on the compression information signal Spd and then generates the rate signal Srr to optimize the quantization scale code (in other words, an encoding rate in the compression information signal Spd) in the quantization of the quantization unit 3, and further outputs it to the quantization unit 3.

More actually, as shown in FIG. 1B, the CPU 9a in the rate controller 9 sends and receives data to and from the memory 9b, as a memory signal Sm, in accordance with the input compression information signal Spd, as described later, and then generates the rate signal Srr to establish the quantization scale code in the quantization unit 3, and further outputs it to the quantization unit 3.

Next, the process in the rate controller 9 according to the present invention will be described below with reference to FIGS. 2 to 11.

Figure 2:
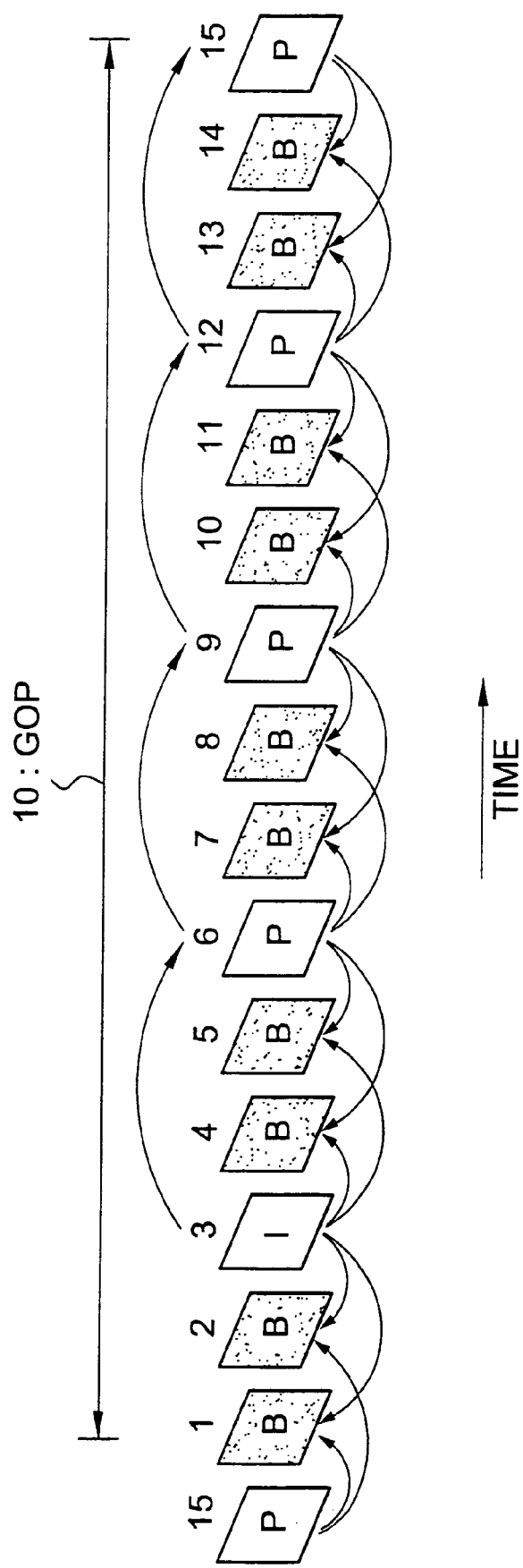
FIG. 2 is a diagram showing an example of frame images constituting a GOP.

At first, before actually describing this process, an information unit referred to as the GOP (Group Of Picture) in the compression information signal Spd compressed and encoded by the MPEG2 method is schematically described below with reference to FIG. 2. FIG. 2 shows an example of a plurality of frame images constituting one GOP.

The image information included in the compression information signal Spd has an information unit referred to as a video pack. Moreover, this video pack includes one or a plurality of GOPs.

FIG. 2 shows a case in which a single GOP 10 is composed of 15 sheets of frame images (about 0.5 seconds in terms of a reproduction time) (this number of frame images is defined as a general rule, so that the number of frame images included in the single GOP 10 is not constant in the MPEG2 method). A frame image indicated by a symbol "I" among them is referred to as an I picture (Intra-coded Picture), which implies a frame image in which a perfect frame image can be reproduced from only a self-image.

A frame image indicated by a symbol "P" is referred to as a P picture (Predictive-coded picture). This is a prediction image generated by decoding the difference from a prediction image which is compensated and reproduced in accordance with an already-decoded I picture or another P picture.

A frame image indicated by a symbol "B" is referred to as a B picture (Bidirectionally predictive-coded picture). This is a prediction image reproduced by using not only a temporally-proceeding I picture or P picture but also a temporally-delaying I picture or P picture for the prediction.

In addition, FIG. 2 shows the prediction relations (interpolation relations) between the respective pictures by using arrows.

Here, the MPEG2 method employs the variable rate encoding method in which the data amounts included in the respective GOPs 10 are not constant as mentioned above.

That is, if each picture included in one GOP 10 corresponds to a dynamic image which is fast in movement and further a relative relation between the respective pictures is small, the amount of data to constitute the respective pictures becomes large so that the amount of data included in this one GOP 10 becomes large.

On the other hand, if each picture included in one GOP 10 corresponds to a dynamic image which is not so vigorous in movement and further the relative relation between the respective pictures is large, the amount of the data to constitute the respective pictures becomes small so that the amount of the data included in this one GOP 10 becomes small.

Next, a variable rate control according to the present invention is described with reference to FIGS. 3 to 10.

Figure 3:
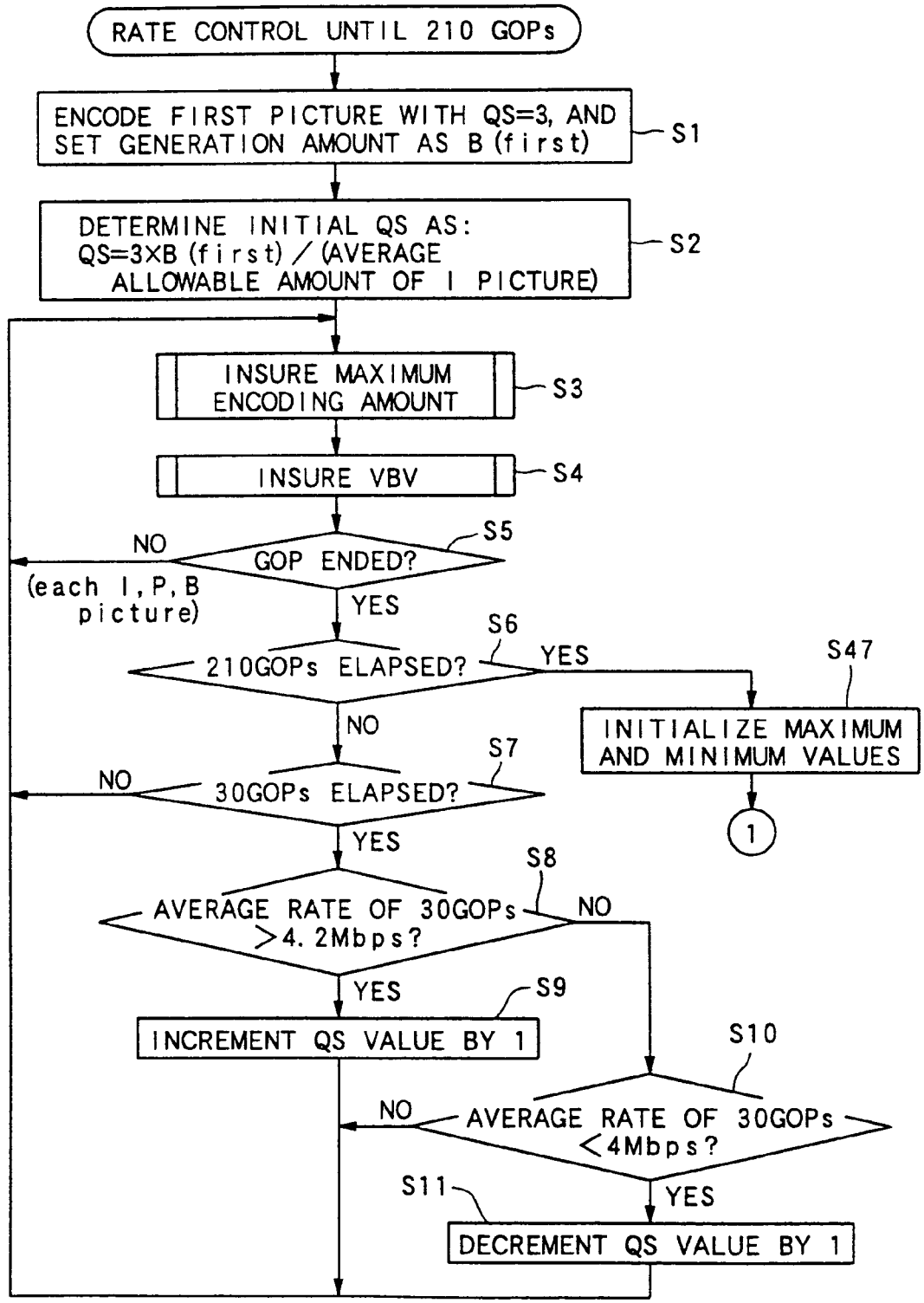
FIG. 3 is a flowchart showing a process of a first control in the embodiment.
Figure 4:
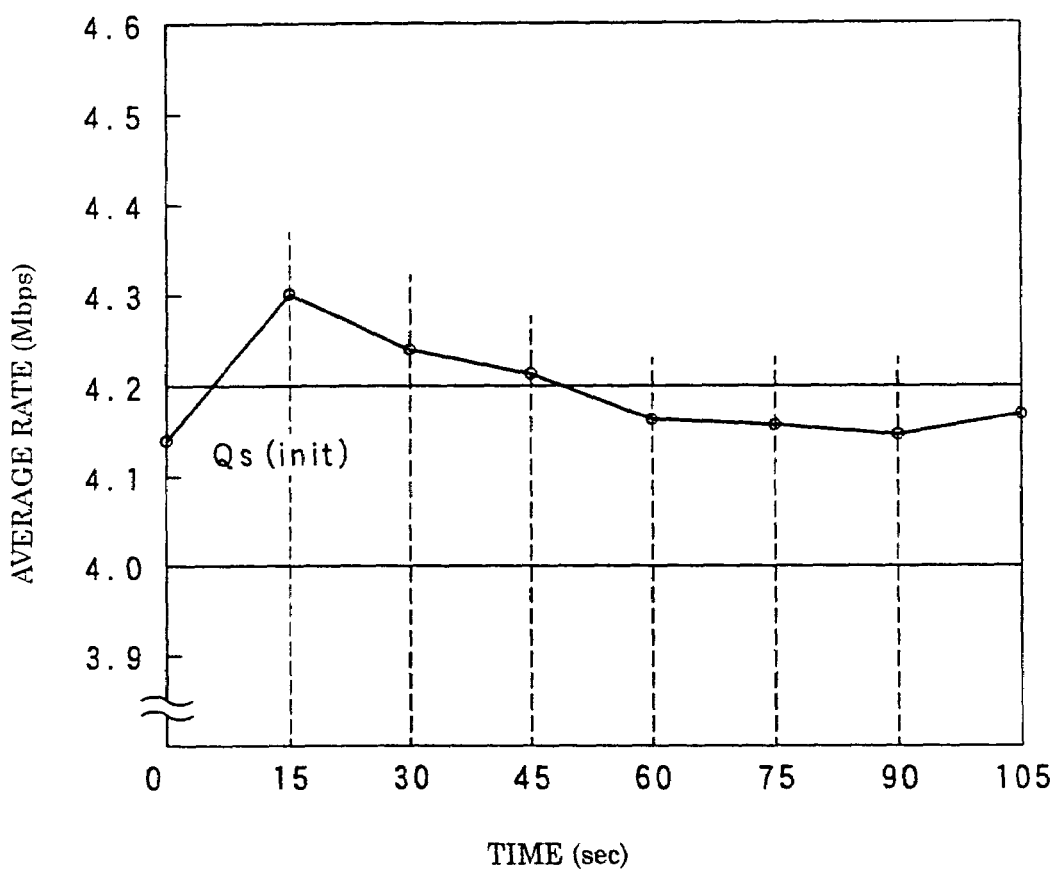
FIG. 4 is a graph explaining the first control with respect to an average rate.
Figure 5:
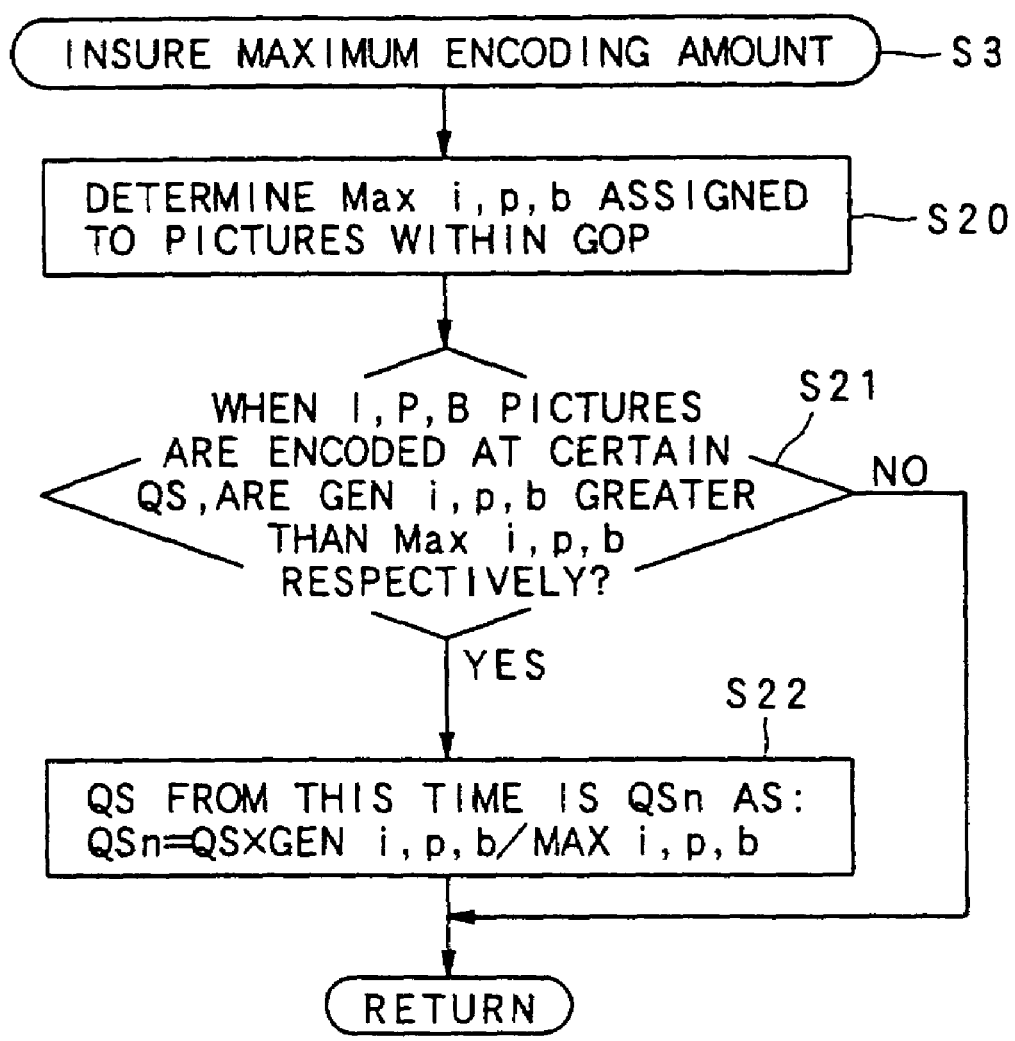
FIG. 5 is a flowchart showing a process of insuring a maximum encoding amount in the embodiment.
Figure 6:
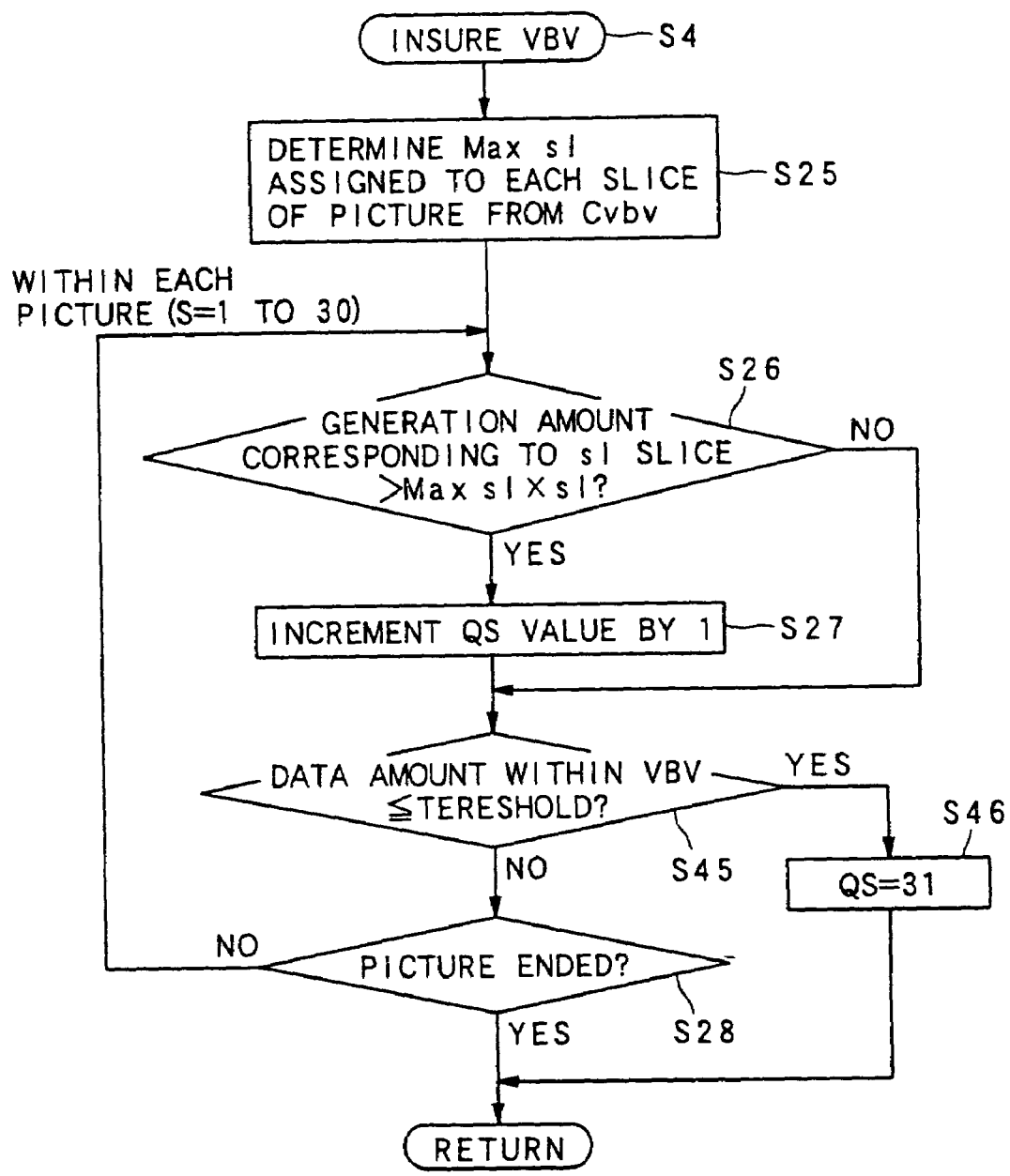
FIG. 6 is a flowchart showing a process of avoiding an overflow and an underflow in a decoding buffer memory in the embodiment.
Figure 7:
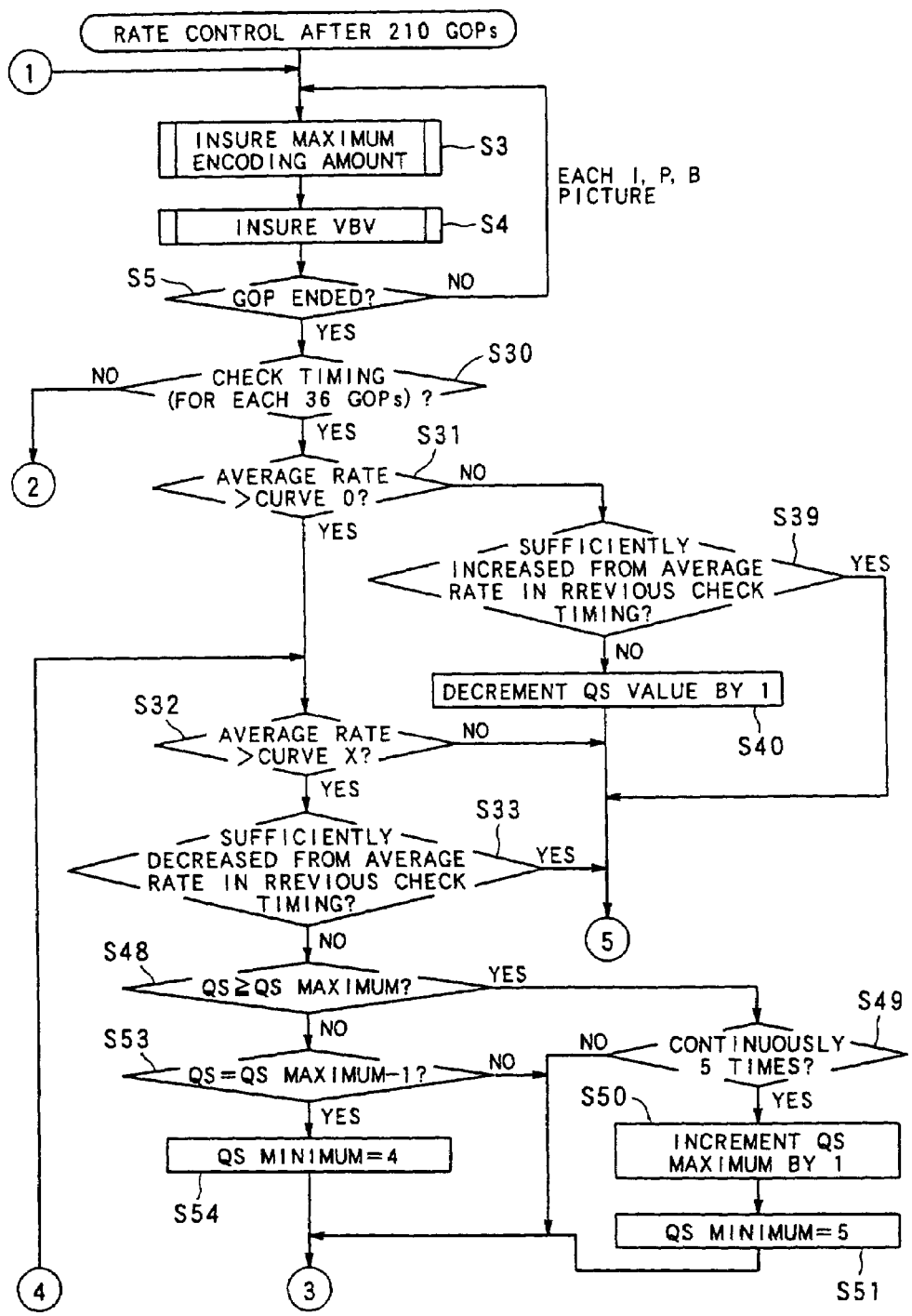
FIG. 7 is one flowchart showing a process of a second control in the embodiment.
Figure 8:
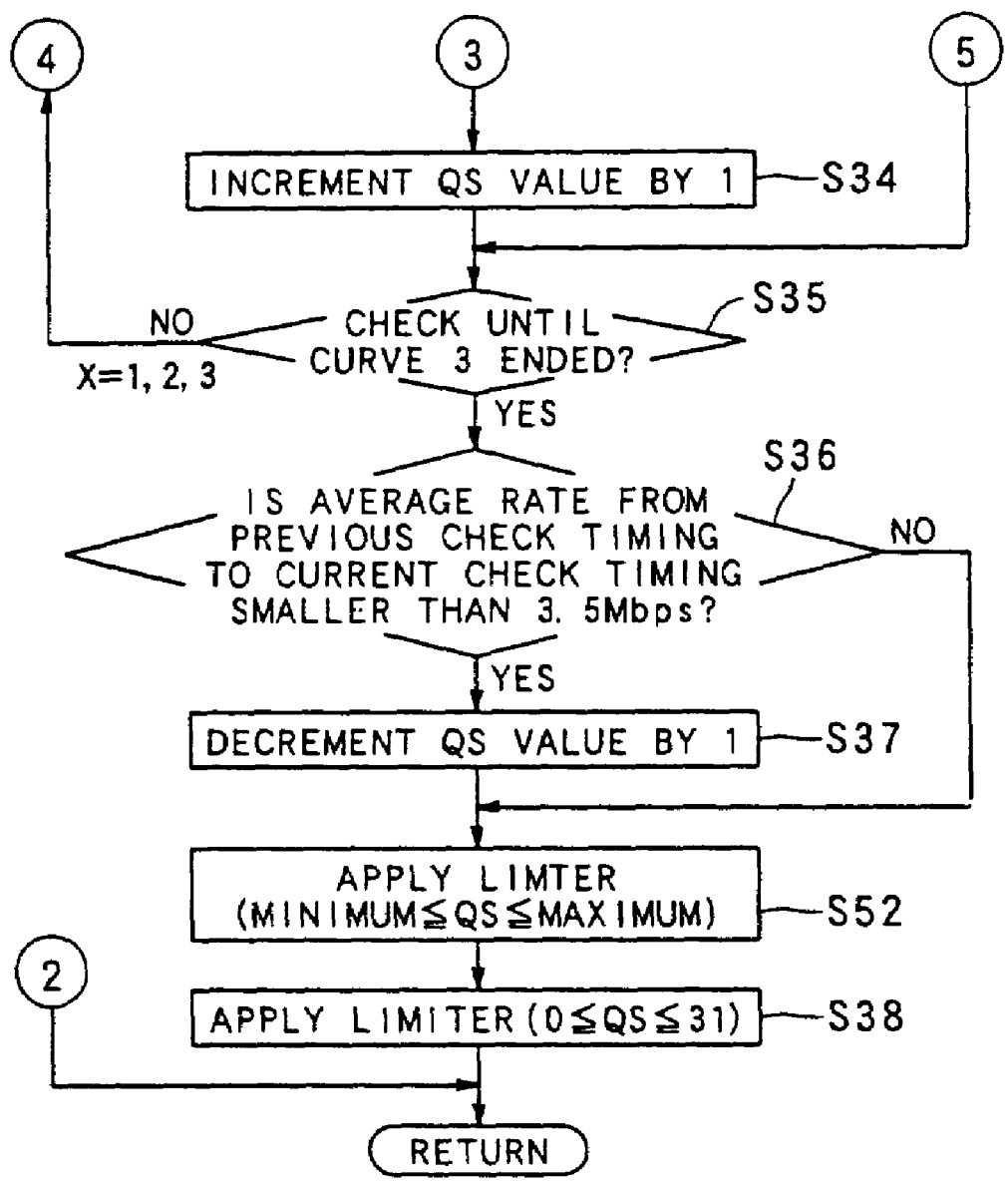
FIG. 8 is another flowchart showing the process of the second control in the embodiment.
Figure 9:
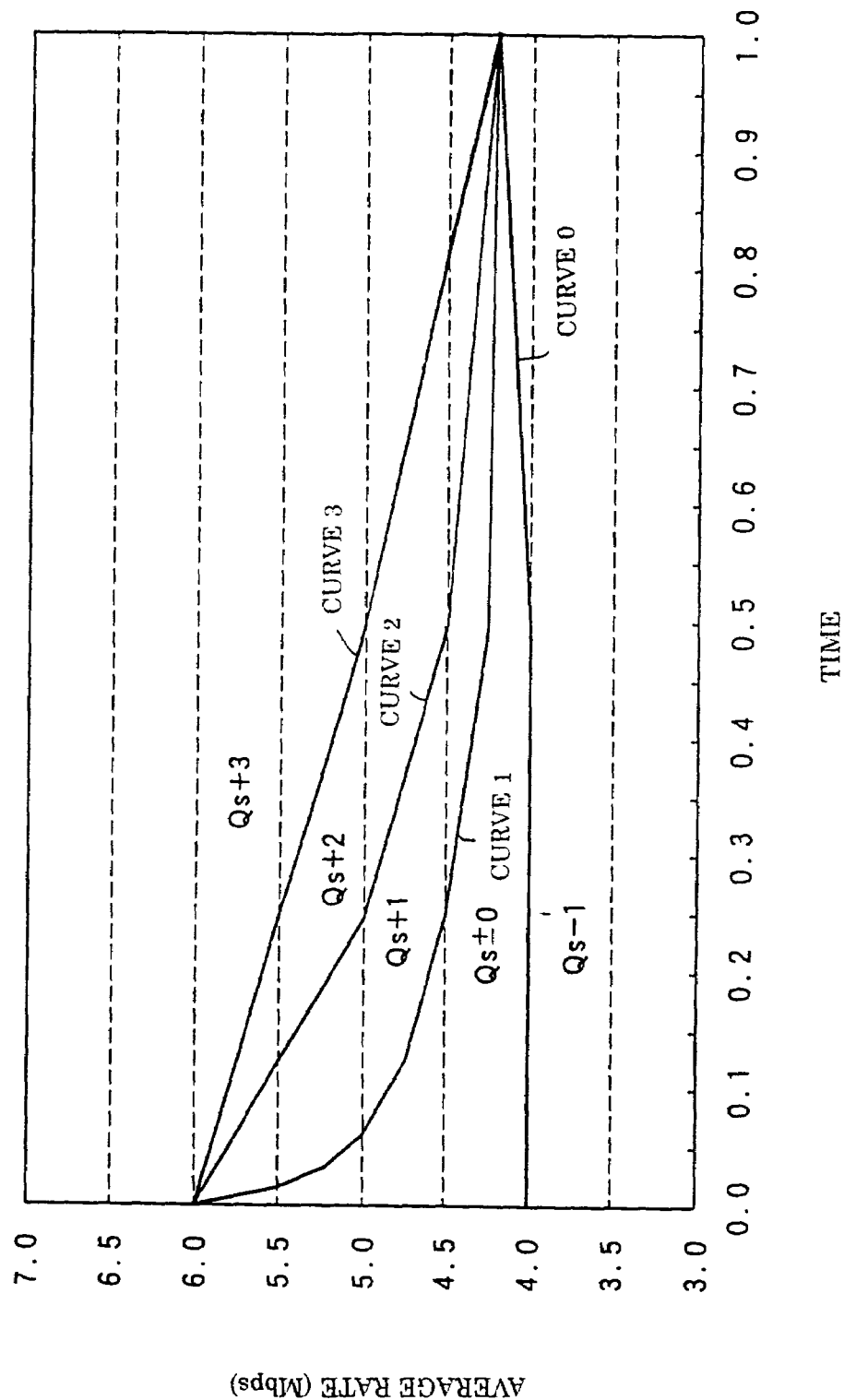
FIG. 9 is a graph explaining the second control with respect to an average rate.

FIG. 3 is a flowchart showing a process of a first control in the embodiment. FIG. 4 is a graph showing the first control to an average rate (namely, an average value of a variable rate). FIG. 5 is a flowchart showing a process of insuring a maximum encoding amount. FIG. 6 is a flowchart showing a process of avoiding an overflow and an underflow in a decoding buffer memory in the embodiment. FIGS. 7 and 8 are flowcharts showing a process of a second control in the embodiment. And, FIGS. 9 and 10 are graphs explaining the second control to an average rate.

In the following variable rate encoding process, the first control with respect to a variable rate approximately for initial 105 seconds (namely, a period corresponding to 210 GOPs 10) in the information to be encoded (hereafter, merely referred to as an "encoding rate") is performed. Then, the second control with respect to the encoding rate for the information on and after the 105 seconds from the lead or initial is performed. Finally, the control to make an average value of the encoding rate in the whole information close to 4.2 Mbps (Mega bit per second) is performed. Also, it is assumed that the maximum value of the allowable encoding rate is defined as 8.0 Mbps.

The reason why the average value of the encoding rate in the whole information is set close to 4.2 Mbps and further the maximum value of the encoding rate is defined as 8.0 Mbps is to satisfy a request as the entire information processing system including the encoding apparatus S in the embodiment. Actually, for example, if considering an information processing system in which a digital information signal Sd obtained by receiving a broadcast wave is compressed and encoded by the encoding apparatus S and then recorded onto a record medium, the average value of the encoding rate in the whole information is established in consideration with a total record capacity of the record medium, a total time of the digital information signal Sd to be recorded onto the record medium and the like. On the other hand, the maximum value of the encoding rate is established in consideration with such a necessity that it is within the range of a record processing ability (a maximum value of a recording speed) of a recorder for recording the information onto the record medium.

In the encoding rate control of the embodiment, a value of the quantization scale code (hereafter, merely referred to as a QS) is firstly set to "3", as shown in FIG. 3, as the encoding rate control process for the initial about 105 seconds in the digital information signal Sd to be encoded. The quantization scale code is used to encode a first picture (i.e., a picture becomes a first I picture in the GOP 10 after the encoding operation of the encoding apparatus S as shown in FIG. 2) included in the digital information signal Sd. Then, a generation encoding amount as the result of this encoding operation is defined as B(first) (Step S1).

Next, by using the generation encoding amount B(first) and the initial value "3" of the quantization scale code, the QS(init) which is an initial QS as the result of the encoding rate control is calculated by a following equation, on an experimental assumption that a product of the QS and the generation encoding amount becomes constant (Step S2).

$$QS(init)=3 \times B(first)/(\text{Average Allowable Amount of I Picture in GOP 10})$$

More specifically, if a ratio of the encoding amounts in the respective pictures existing in one GOP 10 is presently assumed to be I:P:B=Ri:Rp:Rb, a following equation (1) is obtained.

$$QS(init) = \{3 \times B(first)\} / \{4.2 \times 15/29.97 \times Ri/(1 \times Ri + 4 \times Rp + 10 \times Rb)\} \quad (1)$$

Here, the numeral of "29.97" implies a frame frequency (whose unit is Hz) when an image included in the digital information signal Sd is based on the NTSC (National Television System Committee) method. The numeral of "15" implies the number of frame images included in one GOP 10. The numeral of "4.2" implies a target value (whose unit is Mbps) of the average value of the encoding rate when the digital information signal Sd is encoded as a whole. Moreover, the numerals of "1", "4" and "10" imply the numbers of I pictures, P pictures and B pictures included in one GOP 10, respectively.

After the QS(init) is obtained from the equation (1), 30 GOPs 10 included in the compression information signal Spd are obtained by the quantization and the encoding in which this QS(init) is used as a general rule. At this time, the CPU 9a generates the rate signal Srr while storing into the memory 9b the encoding rates for the respective GOPs 10 independently of each other (refer to FIG. 2).

Next, the QS is checked such that the encoding rate in the currently-proceeding encoding operation does not exceed the allowable maximum value. If it may exceed the maximum value, the QS(init) at that time is corrected (Step S3). The detailed portion of the process at this step S3 will be detailed later.

After the correction for the QS is ended, it is judged whether or not the overflow or the underflow occurs in the decoding buffer memory (typically, referred to as a VBV (Video Buffering Verifier) buffer) in a decoder for decoding the encoded digital information signal Sd if the digital information signal Sd is being encoded while the current QS is maintained. If the overflow or the underflow may occur, the QS at that time is corrected (Step S4). The detailed portion of the process at this step S4 will be also detailed later.

After the correction for the QS is again ended, it is judged whether or not the processes at the steps S3 and S4 are ended for all the frame images within one GOP 10 (Step S5). If they are not ended (Step S5; NO), the operational flow returns back to the step S3, so as to execute the processes at the steps S3 and S4 for all the pictures included in the GOP 10.

On the other hand, if it is judged in the judgment at the step S5 that the processes are ended for all the pictures in one GOP 10 (Step S5; YES), it is judged whether or not a period (e.g., about 105 seconds) corresponding to 210 GOPs from the lead of the digital information signal Sd on which the first control for the QS is performed has elapsed (Step S6). If the period has elapsed (Step S6; YES), as the initial values of a maximum value and a minimum value of the QS in a later-described second control process (namely, a maximum value and a minimum value which are set in consideration with an image quality when the dynamic image information is decoded and the like), the maximum value is set to "9", and the minimum value is set to "3", respectively (Step S47). After that, the operational flow proceeds to the second control process. If the period has not elapsed (Step S6; NO), it is judged whether or not a period (e.g., about 15 seconds) corresponding to 30 GOPs 10 has elapsed after the QS(init) is established at the step S2 (Step S7).

If the period has not elapsed (Step S7; NO), the operational flow returns back to the step S3, so as to continue the process at the steps S3, and S4 until the elapse. On the other hand, if it has elapsed (Step S7; YES), the encoding rates when the 30 GOPs 10 are generated until that time are read out from the memory 9b, and the average value of the encoding rates (namely, the average rate) is calculated. Then, it is judged whether or not this average value is greater than 4.2 Mbps (step S8).

Here, the method for calculating the average value of the encoding rate corresponding to the 30 GOPs 10 is described.

That is, when the average value of the encoding rate corresponding to the 30 GOPs 10 is assumed to be Rgop and further an encoding rate when one GOP 10 is generated by the encoding operation is assumed to be GENgop, the Rgop is calculated by the following equation.

$$Rgop = \left\{ \sum_{GOP=1}^{30} GENgop/30 \right\} \times 29.97/15 \text{ (sheets)}$$

Here, the numeral "29.97/15" in the above-mentioned equation is intended to convert the unit of the encoding rate GENgop into "bps".

If this average value Rgop is greater than 4.2 Mbps (Step S8; YES), the generation encoding amount is determined to be too large. Thus, the QS is incremented by "1" (Step S9), so as to decrease the generation encoding amount. Then, the operational flow returns back to the step S3, so as to continue the first control at the incremented value.

On the other hand, if it is judged in the judgment at the step S8 that the average value Rgop is not greater than 4.2 Mbps (Step S8; NO), it is judged whether or not the average value Rgop is smaller than 4.0 Mbps (Step S10).

If this average value Rgop is smaller than 4.0 Mbps (Step S10; YES), the generation encoding amount is determined to be too small. Thus, the QS is decremented by "1" (Step S11), so as to increase the generation encoding amount. Then, the operational flow returns back to the step S3, so as to continue the first control at the decremented value.

The above-mentioned operations are repeatedly performed for each 30 GOPs 10 (namely, for each about 15 seconds) in the 210 GOPs 10 from the lead in the digital information signal Sd. Thus, the QS that may be suitable for the encoding of the digital information signal Sd at that time can be determined by the first control, under the prediction that the encoding rate is supposed to be converged within a predetermined allowable range (namely, between 4.0 Mbps and 4.2 Mbps) in accordance with the average value (4.2 Mbps) to which the encoding rate over the digital information signal Sd should be converged, until the elapse of the period (about 105 seconds) corresponding to the 210 GOPs 10, even if the encoding rate after the QS(init) is too high for example, as shown in FIG. 4.

Next, the QS correction process to insure the maximum value of the encoding rate at the step S3 is explained with reference to FIG. 5.

At the step S3, in order to insure that the encoding rate does not exceed the maximum value (e.g., 8.0 Mbps in the case of the embodiment), the fact that the product of the QS and the generation encoding amount B is constant is used to correct the QS at each picture unit within the GOP 10.

That is, as shown in FIG. 5, when the maximum value is currently assumed to be MAXRATE (bps), a maximum value MAXgop of the encoding amount assigned to one GOP 10 is as follows.

MAXgop=MAXRATE×15/29.97

Here, the numeral "15/29.97" in the above-mentioned equation implies a period occupied by one GOP 10 within one second in the NTSC method.

This MAXgop of the encoding amount is assigned to each picture at the following rate (Step S20).

I:P:B=Ri:Rp:Rb

At this time, since the I picture is firstly encoded, a maximum allowable encoding amount MAXi for the I picture is as follows.

MAXi=MAXgop×Ri/(1×Ri+4×Rp+10×Rb)

Similarly to the above-mentioned case, with regard to a P picture and a B picture, respective maximum allowable encoding amounts MAXp and MAXb are calculated as follows (Step S20).

MAXp=MAXgop×Rp/(1×Ri+4×Rp+10×Rb)

MAXb=MAXgop×Rb/(1×Ri+4×Rp+10×Rb)

When the maximum allowable encoding amounts of the respective pictures are determined in this way, the respective pictures are encoded in accordance with one of the QSs determined by the processes shown in FIG. 3 after the QS(init). Then, encoding amounts generated as the result are defined as GENpic(pic=i,p,b). It is judged whether or not the GENpic(pic=i,p,b) are greater than MAXpic(pic=i,p,b), respectively (Step S21).

Then, if it is judged in the judgment at the step S21 that all the GENpic are equal to or smaller than the MAXpic (pic=i,p,b) (Step S21; NO), it is determined that the current generation encoding amount is equal to or less than the maximum value and is proper. Thus, since the QS is also proper, the operational flow proceeds to the step S4 without any correction for the QS.

On the other hand, if it is judged in the judgment at the step S21 that any of the GENpic is greater than the MAXpic (Step S21; YES), it is determined that the current generation encoding amount exceeds the maximum value and the generation encoding amount based on this QS is too large and thereby the maximum value of 8.0 Mbps may not be insured. Thus, the quantization and the encoding based on a new QSn as expressed by a following equation after a correction described below are performed for respective pictures within the same GOP 10 from this time (Step S22).

QSn=QS(Immediately Before)×GENpic(pic=i,p,b)/ MAXpic(pic=i,p,b)

Then, the operational flow proceeds to the step S4.

In addition, in the correction at the step S3, since it is defined in advance on the standard that an upper limit value of the QS is "31", it is necessary that values equal to or less than that value are set to QSn. At this time, the values of Ri, Rp and Rb are calculated as follows, when QS of the I picture is assumed to be Qsi, QS of the P picture is assumed to be QSp and QS of the B picture is assumed to be QSb,.

QSi:QSp:QSb=1:8:1.4

Next, the QS correction process for avoiding the overflow or the underflow in the decoding buffer memory in the decoder at the step S4 is explained with reference to FIG. 6.

At first, a relation between the encoding rate and a capacity of the decoding buffer memory is described.

As mentioned above, the generation encoding amounts for the respective pictures after the compression and the encoding are different from each other, in the MPEG2 method.

Thus, the encoding apparatus S in the embodiment has the following configuration. That is, when the digital information signal Sd is decoded by the decoder for extending and decoding the encoded image, in order to prevent the overflow or the underflow from occurring (the occurrence of the overflow may disable the image to be decoded, and on the other hand, the occurrence of the underflow may cause the decoded image to be intermittent) in the decoding buffer memory (i.e., a buffer memory for transiently accumulating therein the decoded image and then controlling an output timing and the like) within the decoder, at the time of the encoding of the encoding apparatus S, the data amount to be encoded (namely, the encoding rate) is established while validating (simulating) an accumulation amount of the data within the decoding buffer memory. Accordingly, the overflow or the underflow is avoided.

More specifically, when the picture is encoded by an encoding buffer memory (not shown) for transiently accumulating therein the digital information signal Sd at the time of the encoding and then it is accumulated in the encoding buffer memory, the dynamic image information is outputted from the decoding buffer memory at a corresponding timing, in response to the accumulated pictures at a time of decoding. Thus, an accumulation amount in the decoding buffer memory is reduced in response to the accumulated pictures at the corresponding timing.

Here, the output rate of the encoding buffer memory (for example, a recording rate onto a record medium) and the input rate of the decoding buffer memory (for example, a reproducing rate from the record medium) are both substantially constant. Thus, if the encoding amount of a picture is too small, the amount of the dynamic image information outputted at a single operation from the decoding buffer memory at the time of the decoding becomes small, which causes the overflow to occur in the decoding buffer memory. On the other hand, if the encoding amount of the picture is too large, the amount of the dynamic image information outputted at a single operation from the decoding buffer memory at the time of the decoding becomes large, which causes the underflow to occur in the decoding buffer memory.

Therefore, the CPU 9a outputs the rate signal Srr to establish the encoding rate while always validating (simulating) the change of the accumulation amount in this decoding buffer memory.

The process at the step S4 is explained with reference to FIG. 6.

At the step S4, the CPU 9a always simulates a remaining amount Cvbv of the decoding buffer memory.

Actually, as shown in FIG. 6, at first, in accordance with the remaining amount Cvbv, a maximum encoding amount MAXsl assigned to each slice (a slice is configured such that 30 areas, each of which is long sideways and band-shaped and also referred to as a slice, are longitudinally piled up on a display screen) within each picture is calculated by a following equation (Step S25).

MAXsl=Cvbv/30

In addition, it is assumed in the above-mentioned equation that there is an allowable amount for only the remaining amount Cvbv in the decoding buffer memory for each picture of the image in the compression information signal Spd.

When the maximum encoding amount MAXsl is calculated, the relationship of magnitude between a generation encoding amount GENsl in sl slices until a current slice and (MAXsl×sl) is compared at a slice unit (Step S26). If it is judged in the judgment at the step S26 that GENsl is greater than (MAXsl×sl) (Step S26; YES), the generation encoding amount under this QS is determined to be too large, which may cause the underflow to occur in the decoding buffer memory. Thus, the QS when encoding the slices from this time is incremented by "1" (Step S27).

On the other hand, if it is judged in the judgment at the step S26 that GENsl is not greater than (MAXsl×sl) (Step S26; NO), or after the QS when the slices from this time are encoded is incremented by "1" (Step S27), it is judged whether or not the information amount within the decoding buffer memory is simulated to be equal to or less than a predetermined threshold (Step S45).

The threshold targeted by the comparing process at the step S45 is defined as a value in which a value where the maximum capacity of the decoding buffer memory is assigned to the single slice in the above-mentioned picture is multiplied by the number of slices simulated to be currently accumulated in the decoding buffer memory. More specifically, for example, if a dynamic image information corresponding to 10 slices is simulated to be currently accumulated in the decoding buffer memory, a value in which a value where the maximum capacity of the decoding buffer memory is divided by "30" (i.e., the number of slices within the single picture) is multiplied by "10" is defined as a threshold at that time.

Then, if the information amount within the decoding buffer memory is simulated to be greater than this threshold (Step S45 YES), the continuation of the input of the dynamic image information under this simulated condition may cause the overflow to occur in the decoding buffer memory. Thus, the QS is transiently set to "31", which is the allowable maximum value, to thereby reduce the generation encoding amount (Step S46). Then, the operational flow proceeds to the process at the step S5.

On the other hand, if it is simulated in the judgment at the step S45 that the information amount within the decoding buffer memory is not greater than the threshold (Step S45; NO), it is simulated that there is no possibility in which the overflow currently occurs in the decoding buffer memory at once. It is judged whether or not the above-mentioned process is ended for all the slices within the single picture (Step S28). If it is not ended (Step S28; NO), the operational flow returns back to the step S26, so as to perform the processes at the steps S26 to S28 and S45 and S46 on the slices remaining within each picture.

On the other hand, if it is judged in the judgment at the step S28 that the above-mentioned process is ended for all the slices within the single picture (Step S28; YES), the operational flow proceeds to the process at the step S5.

Next, the encoding rate control process after the original 105 seconds in the digital information signal Sd to be encoded, according to the present invention, is explained with reference to FIGS. 7 to 10B.

In the flowcharts shown in FIGS. 7 and 8, the same step numbers are given to the same processes identical to those of the flowchart shown in FIG. 3. Then, the explanations of the detailed portions are omitted.

Also in the following embodiment, a time unit at which the encoding rate of the digital information signal Sd to be encoded is controlled is assumed to be T seconds. This period of the T seconds is divided by a period corresponding to 36 GOPs 10. Each division point is established as a timing (hereafter, referred to as a check timing) to check an average value of the encoding rate.

As shown in FIGS. 7 and 8, as for the encoding rate control after the initial about 105 seconds in the digital information signal Sd (namely, the period corresponding to 210 GOPs 10 from the lead of the digital information signal Sd), the processes similar to those at the steps S3 to S5 in FIG. 3 are firstly executed. Then the insurance for the maximum value of the generation encoding amount and the insurance for the normal accumulation operation in the decoding buffer memory are executed.

Then, if the processes at the steps S3 and S4 are ended for one GOP 10 (Step S5; YES), it is judged whether or not the check timing is reached while the encoding is continued (Step S30).

Then, if the check timing is not reached (Step S30; NO), the operational flow proceeds to the original encoding process, so as to continue the encoding as it is.

At this time, in the encoding process after the proceeding, the processes at the steps S3 to S5 shown in FIG. 7 are repeated until the check timing (namely, until a generation of next 36 GOPs 10 is completed). If the check timing is reached (Step S30; YES), processes at the following steps S31 to S40 and S48 to S54 are immediately executed. Next, a maximum value and a minimum value of the QS after the execution are used to sequentially repeat the processes at the steps S3 to S5 shown in FIG. 7, in the encoding process until a next check timing.

On the other hand, if it is judged in the judgment at the step S30 that the check timing is reached (Step S30; YES), it is judged whether or not an average rate at that timing belongs to an area above a curve 0 in FIG. 9 (Step S31).

Here, the average rate at the step S31 is described. The average rate implies that an average value of encoding rate of all GOPs 10 (which are stored in the memory 9b each time the respective GOPs 10 are encoded) from a lead timing of the whole digital information signal Sd (namely, a time of an input start of the whole digital information signal Sd) to the check timing, for each check timing, is assumed to be an average rate Rave.

That is, it is represented as follows.

$$Rave = \left\{ \sum_{GOP=1}^{CT} GENgop / CT \right\} \times 29.97 / 15$$

In this equation, GENgop implies the encoding rate when one GOP 10 is generated, as mentioned above. CT implies the number of GOPs 10 existing until that check timing.

Moreover, the curve 0 at the step S31 is described with reference to FIG. 9. A plurality of curves, each of which is experimentally determined in advance, are established in a graph in which a horizontal axis represents a time and a vertical axis represents an average rate Rave, as shown in FIG. 9, in the processes shown in FIGS. 7 and 8. Then, each curve and an average rate Rave at that time are compared with each other, in the respective check timings. The QS is increased or decreased in accordance with the compared result, and a second control is performed on the encoding rate. Finally, the average value of the encoding rate of the whole information included in the digital information signal Sd is converged to the above-mentioned value close to 4.2 Mbps.

Here, the curve is described in detail. As shown in FIG. 9, four curves are established in advance, in this embodiment. Each curve actually connects the following respective points through straight lines. That is, when coordinate points on FIG. 9 through which each curve passes are indicated by coordinate values (t, Rave) respectively including a time t and an average rate Rave, the curve 0 is a line passing through 3 points represented by:

(t, Rave)=(0, 4.0), (T/2, 4.0) and (T, 4.2)

A curve 1 is a line passing through 8 points represented by:

(t, Rave)=(0, 6.0), (T/64, 5.5), (T/32, 5.25), (T/16, 5.0), (T/8, 4.75), (T/4, 4.5), (T/2, 4.25) and (T, 4.2)

A curve 2 is a line passing through 4 points represented by:

(t, Rave)=(0, 6.0), (T/4, 5.0), (T/2, 4.5) and (T, 4.2)

A curve 3 is a line passing through 3 points represented by:

(t, Rave)=(0, 6.0), (T/2, 5.0) and (T, 4.2)

In the following processes, if the average rate Rave at each check timing belongs to an area below the curve 0 in FIG. 9, the generation encoding amount is determined to be small. So, in order to increase it, the QS at that time is decremented by "1". If the average rate Rave belongs to an area between the curve 0 and the curve 1, the generation encoding amount is determined to be moderate. So, the QS is not changed. If the average rate Rave belongs to an area between the curve 1 and curve 2, the generation encoding amount is determined to be large. So, in order to reduce it, the QS at that time is incremented by "1". If the average rate Rave belongs to an area between the curve 2 and the curve 3, the generation encoding amount is determined to be further large. So, in order to further reduce it, the QS at that time is incremented by "2". And, if the average rate Rave belongs to an area above the curve 3, the generation encoding amount is determined to be extremely large. So, in order to quickly reduce it, the QS at that time is incremented by "3". Accordingly, the average rate is finally set to a value close to 4.2 Mbps.

If it is judged in the judgment at the step S31 that the calculated average rate Rave belongs to the area above the curve 0 in FIG. 9 (Step S31; YES), it is judged whether or not the average rate Rave belongs to the area above the next curve 1 (Step S32).

If it is judged in the judgment at the step S32 that the average rate Rave does not belong to the area above the curve 1 (Step S32; NO), it is determined that the average rate Rave belongs to the area between the curve 0 and the curve 1. Then, the operational flow proceeds to the step S35 without correcting the QS.

On the other hand, if it is judged in the judgment at the step S32 that the average rate Rave belongs to the area above the curve 1 (Step S32; YES), an average rate Rave in a check timing immediately before is compared with an average rate Rave at a current check timing. Then, it is judged whether or not the latter is sufficiently smaller than the former (Step S33).

The process at this step S33 is explained with reference to FIG. 10A.

In the second control for the average rate shown in FIGS. 7 and 8, if the check timing immediately before is defined as t(CT−1) and the average rate Rave at the check timing immediately before is defined as Rave(CT−1) and on the other hand the current check timing is defined as t(CT) and the current average rate Rave is defined as Rave(CT), although the Rave(CT) belongs to the area above the curve 1 (Step S32; YES), when the Rave(CT) is sufficiently decreased over the Rave(CT−1), it is determined that the average rate Rave has a desirable change tendency. So, the QS is not changed in this case. Then, the judgment as to whether or not it is sufficiently decreased is carried out in accordance with a following equation (2).

$$\text{Rave}(CT) < (\text{Rave}(CT-1)-4.2) \times \{(T-t(CT))/(T-t(CT-1))\} + 4.2 \qquad (2)$$

That is, if the equation (2) is satisfied, the QS is not changed (Step S33; YES). The operational flow proceeds to the step S35, as it is.

On the other hand, if the equation (2) is not satisfied (Step S33; NO), it is determined that the average rate Rave is not sufficiently decreased, and under this condition, the average rate Rave may not be converged to a desirable value. Next, it is judged whether or not the current QS is greater than the maximum value (currently, "9") established at the step S47 (Step S48).

If it is judged in the judgment at the step S48 that the current QS is not greater than the maximum value (Step S48; NO), it is judged whether or not the current QS is equal to a QS, which is smaller by 1 than the maximum value (Step S53).

If it is judged in the judgment at the step S53 that the current QS is equal to the QS which is smaller by 1 than the maximum value (Step S53; YES), in order to decrease the average rate at the process shown in FIG. 7 for the next 36 GOPs 10, the minimum value of the QS is set to "4" (Step S54), and the QS is incremented by "1" (Step S34). Then, it is judged whether or not the processes at the steps S32 to S34, S48 to S51 and S53 and S54 are performed until the curve 3 (Step S35). If they are not ended (Step S35; NO), the operational flow returns back to the step S32, so as to perform the processes at the steps S32 to S34, S48 to S51 and S53 and S54 on the next curve 2 or 3. Accordingly, the processes at the steps S32 to S34, S48 to S51 and S53 and S54 are performed on the curves 1 to 3.

Figure 10A:
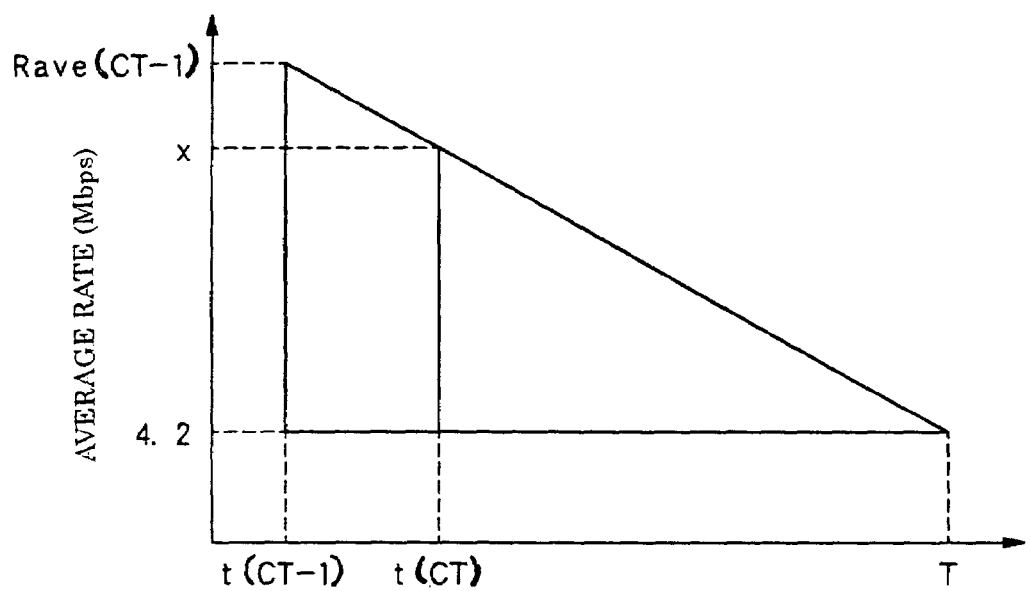
FIG. 10A is one graph showing a judgment of necessity for a QS control, in the second control with respect to the average rate.

In addition, the equation (2) is used to compare a value indicated by x in FIG. 10A with the Rave(CT) and judge whether or not the QS is corrected in accordance with the relationship of magnitude between them.

Then, if it is judged in the judgment at the step S48 that the current QS is equal to or greater than the maximum value (Step S48; YES), it is judged whether or not a status in which the QS is equal to or greater than the maximum value continues in five successive check timings (Step S49).

If the status does not continue successively five times (Step S49; NO), the operational flow proceeds to the step S34 so as to reduce the value of the encoding rate. Thus, the QS is incremented by "1".

On the other hand, if it is judged in the judgment at the step S49 that the status in which the QS is equal to or greater than the maximum value continues successively five times (Step S49; YES), it is determined that the current encoding rate is extremely increased which thereby requires the emergency reduction of the encoding rate. Accordingly, the maximum value of the QS is increased by 1 to thereby increase the QS (Step S50), and also the minimum value of the current QS is increased to "5". Then, the operational flow proceeds to the step S34.

On the other hand, if it is judged in the judgment at the step S53 that the current QS is not equal to the QS which is smaller by 1 than the maximum value (Step S53; NO), the operational flow proceeds to the step S34, in order to reduce the value of the encoding rate. Then, the QS is incremented by 1.

If it is judged in the judgment at the step S35 that the processes at the steps S32 to S34, S48 to S51 and S53 and S54 are ended until the curve 3 (Step S35; YES), it is judged whether or not the average rate Rave from the check timing immediately before to the current check timing is lower than 3.5 Mbps (Step S36), so as to protect the average rate Rave from being extremely reduced. If the average rate Rave is lower than 3.5 Mbps (Step S36; YES), since the current average rate Rave is too low, the QS is decremented by "1" (Step S37) so as to increase the generation encoding amount.

If it is judged in the judgment at the step S36 that the average rate Rave is not lower than 3.5 Mbps (Step S36; NO), the current average rate Rave is determined to be adequate. Then, the operational flow proceeds to the step S52 as it is.

Next, the minimum value and the maximum value of the current QS are used to regulate the QS (namely, if the QS is less than the minimum value, the QS is set at the minimum value, and if the QS is greater than the maximum value, the QS is set at the maximum value) (Step S52). Then, the operational flow proceeds to the step S38.

Finally, the limitation is applied such that the current QS belongs to a range allowable as the QS in view of the performance of the encoding apparatus S, namely, a value which is equal to or greater than 0 and equal to or less than 31 (in other words, if the QS is greater than 31, it is set to 31) (Step S38). Then, the operational flow proceeds to the original encoding process, so as to continue the encoding operation as it is.

The difference between the regulating process at the step S38 and the regulating process at the step S52 is as follows. That is, the former is the process of regulating the QS to the value within the range allowable as the QS, in view of the performance of the encoding apparatus S (namely, in the MPEG2 method). On the contrary, the latter is the process of regulating the QS in view of the image quality when the image is reproduced.

On the other hand, if it is judged in the judgment at the step S31 that the average rate Rave does not belong to the area above the curve 0 (Step S31; NO), an average rate at a check timing immediately before is compared with an average rate at a current check timing, and it is judged whether or not the latter is sufficiently greater than the former (Step S39).

The process at this step S39 is explained with reference to FIG. 10B.

In the second control to the average rate shown in FIGS. 7 and 8, when the parameters t(CT−1), Rave(CT−1), t(CT) and Rave(CT) are set similarly to the case of the step S33, even if the Rave(CT) belongs to the area below the curve 0 (Step S31; NO), when the Rave(CT) is sufficiently increased over the Rave(CT−1), it is determined that the average rate Rave has a desirable change tendency. So, the QS is not changed in this case. Then, the judgment as to whether or not it is sufficiently increased is carried out in accordance with a following equation (3).

$$\text{Rave}(CT) > (4.2 - \text{Rave}(CT-1)) \times \{(t(CT) - t(CT-1))/(T - t(CT-1))\} + \text{Rave}(CT-1) \quad (3)$$

That is, if the equation (3) is satisfied, it is determined that the QS is not changed (Step S39; YES). Then, the operational flow proceeds to the step S35, as it is.

On the other hand, if the equation (3) is not satisfied (Step S39; NO), it is determined that the average rate Rave is not sufficiently increased, and under the current QS, the average rate Rave may not be converged. So, in order to increase the encoding rate, the QS is decremented by "1" (Step S40). Then, the operational flow proceeds to the step S35, as it is. After that, the above-mentioned processes are carried out.

Figure 10B:
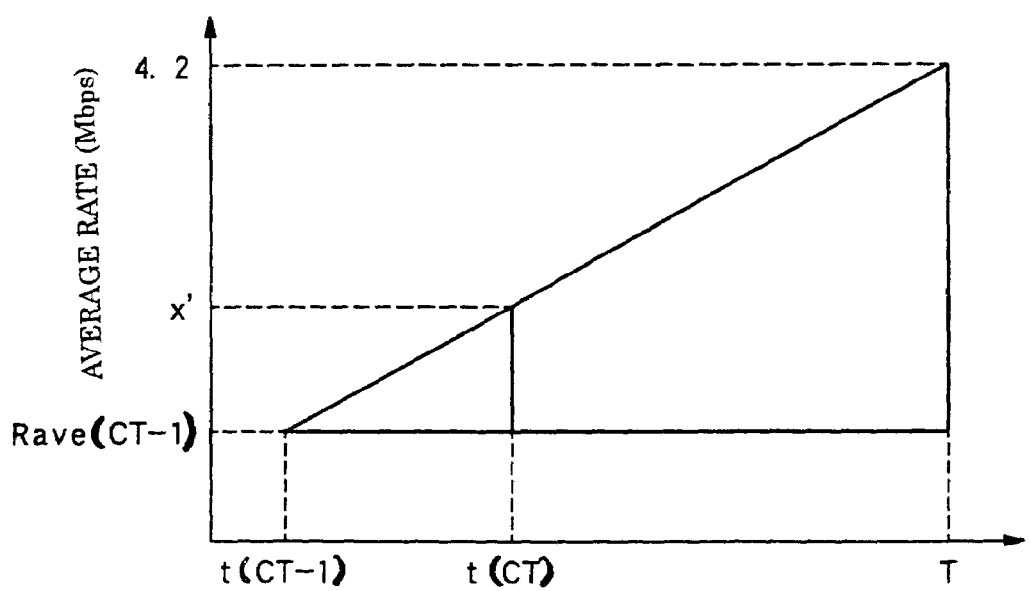
FIG. 10B is another graph showing the judgment of necessity for the QS control in the second control with respect to the average rate.

In addition, the equation (3) is used to compare a value indicated by x' in FIG. 10B with the Rave(CT) and judge whether or not the QS is corrected in accordance with the relationship of magnitude between them.

As mentioned above, according to the encoding rate control process in the embodiment, as for the encoding rate when the digital information signal Sd is encoded, the encoding rate is finally converged to the value close to the predetermined average value (4.2 Mbps) by using the two-stage control of the first control and the second control. Thus, while the deterioration of the image quality is suppressed to a minimum, the digital information signal Sd can be encoded in the real time.

The first control and the second control are carried out by changing the QS when the digital information signal Sd is quantized. Thus, it is possible to effectively control the encoding rate.

Moreover, at the time of the first control (the period corresponding to the 210 GOPs 10 from the point of the start of the input of the digital information signal Sd), the average rate for each about 15 seconds (namely, for each 30 GOPs 10) is used to carry out the first control. Also at the time of the second control after the first control, the average rate in the encoding of all the information from the lead of the digital information signal Sd to that check timing is used to carry out the second control. Thus, at the time of the first control, it is possible to carry out the first control by using the simple process. Also at the time of the second control, the encoding rate can be further surely converged to the value close to the predetermined average value.

Furthermore, by minutely dividing the area (refer to FIG. 9) as compared with the area for which it is judged whether or not the average rate at the time of the first control is allowable (refer to FIG. 4), it is judged whether or not the average rate at the time of the second control is allowable. Thus, the encoding rate can be surely converged to the value close to the predetermined average value by using the simple configuration.

Also, the area, for which it is judged whether or not the average rate at the time of the first control is allowable, is divided through the straight lines, and further the area, for which it is judged whether or not the average rate at the time of the second control is allowable (refer to FIG. 9), is divided through the curves. Thus, it is possible to carry out the first control by using the simple configuration, and also possible to carry out the second control in which the encoding rate is not extremely varied.

Moreover, the QS is corrected within the range in which the consistency with the maximum value of the encoding rate can be kept. Thus, it is possible to avoid the occurrence of the trouble, such as an interruption of the encoding process and the like, resulting from the excess in the maximum value of the encoding rate.

Furthermore, the encoding operation is carried out while validating the accumulation amount in the decoding buffer memory used to decode the compression information signal Spd which is compressed and encoded. Thus, at the time of decoding, the overflow or the underflow does not occur in the decoding buffer memory. Hence, it is possible to carry out the encoding operation in which the decoding operation can be stably carried out.

Also, the encoding rate is sequentially converged to the average value close to the predetermined average value. Accordingly, while the deterioration of the image quality in the digital information signal Sd is suppressed to a minimum, the digital information signal Sd can be encoded in the real time.

Furthermore, the QS value is set to the value within the range which is equal to or greater than the minimum value and equal to or less than the maximum value. Thus, the encoding rate can be controlled further adequately. Also, the maximum value and the minimum value are changed in accordance with the reproduction manner of the dynamic image information. Hence, the range in which the QS value is changed is regulated in accordance with the reproduction manner of the dynamic image information. Accordingly, it is possible to control the encoding rate while effectively preventing the reproduction manner of the dynamic image information to be deteriorated.

In addition, the check timing at the time of the second control is established for each 36 GOPs, in the above-mentioned embodiments. Other than it, for example, it may be established at a minute interval in the former stage and the latter stage on the time axis of the encoding, and at a sparse interval in the middle stage of the encoding.

In this case, a temporally minute QS control is performed on the former stage in which the encoding rate may be largely varied and on the latter stage in which the encoding rate must be converged to the finally targeted average value. Then, a temporally sparse QS control is performed on the middle stage in which the encoding rate is stable. Accordingly, it is possible to surely converge the encoding rate to the average value close to the predetermined average value while reducing the process load at the time of the second control.

In the above-mentioned embodiments, the case is described in which the present invention is applied to the compression and encoding operation according to the MPEG2 method. Other than it, the present invention can be widely applied to an encoding apparatus which carries out the encoding in the real time while optimizing the encoding rate.

Figure 11:
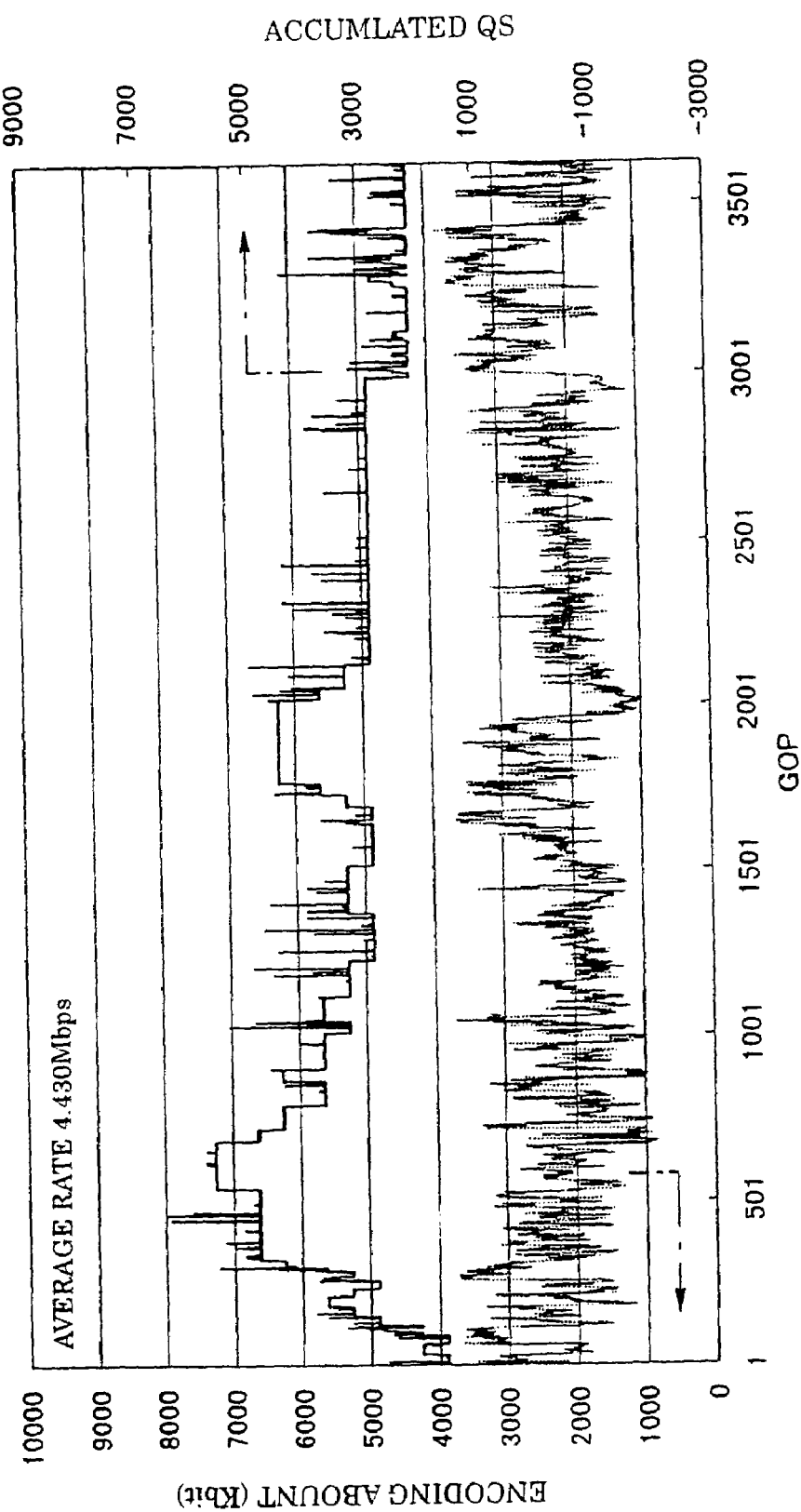
FIG. 11 is a graph explaining the embodiment.

The actual change of the encoding rate when the above-mentioned encoding rate control process is performed with respect to the image for 30 minutes within a music program broadcast on a television is explained with reference to FIG. 11. In FIG. 11, a horizontal axis represents a temporal length of information which is encoded and indicated by the number of GOPs 10. A left vertical axis represents a generation encoding amount (a unit of kbit) in each GOP 10. And, a right vertical axis represents a sum of QS values of respective slices in each GOP 10.

As can be evident from FIG. 11, if the present invention is applied, the encoding rate is finally converged to 4.430 Mbps which is the value close to the targeted 4.2 Mbps.

As mentioned above, according to the present embodiment, the encoding rate is controlled in accordance with the average value of the encoding rate for each change timing. Thus, the encoding rate can be surely converged to the average value corresponding to the predetermined average value. Hence, it is possible to encode the dynamic image information while suppressing the deterioration of the information quality to a minimum.

Therefore, even if the dynamic image information is encoded in the real time, the encoding can be carried out without the deterioration of the information quality.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Applications No. 10-302294 filed on Oct. 23, 1998 and No. 11-237817 filed on Aug. 25, 1999 including the specification, claims, drawings and summary are incorporated herein by reference in its entirety.

What is claimed is:

1. An encoding rate controller for controlling the encoding rate of an encoder, the encoding rate controller comprising a control circuit configured to perform a first encoding rate control process for a first portion of a signal supplied to the encoder and a second, different encoding rate control process for a second, different portion of the signal,
wherein the first encoding rate control process calculates an average encoding rate based on encoding rates at a plurality of times, determines whether the calculated average encoding rate is greater than an upper value or less than a lower value and controls the encoding rate based on the determination, and the second encoding rate control process calculates an average encoding rate based on encoding rates at a plurality of times, determines into which of two or more rate ranges the calculated average rate falls and controls the encoding rate based on the determination.

2. An encoding rate controller according to claim 1, wherein the first signal portion temporally precedes the second signal portion.

3. An encoding rate controller according to claim 1, wherein the first signal portion is a predetermined number of groups of pictures.

4. An encoding rate controller according to claim 1, wherein the second encoding rate control process determines a rate of change of the encoding rate and further controls the encoding rate based on the determination.

5. A data encoding apparatus comprising:
a data quantizing device;
an encoder for encoding data quantized by the data quantizing device; and
an encoding rate controller for controlling the quantization scale of the data quantizing device, wherein the encoding rate controller comprises a control circuit configured to perform a first encoding rate control process for a first portion of a signal supplied to the encoder and a second, different encoding rate control process for a second, different portion of the signal,
wherein the first encoding rate control process calculates an average encoding rate based on encoding rates at a plurality of times, determines whether the calculated average encoding rate is greater than an upper value or less than a lower value and controls the encoding rate based on the determination, and the second encoding rate control process calculates an average encoding rate based on encoding rates at a plurality of times, determines into which of two or more rate ranges the calculated average rate falls and controls the encoding rate based on the determination.

6. A data encoding apparatus according to claim 5, for encoding video data.

7. A method for controlling the encoding rate of an encoder, comprising:

performing a first encoding rate control process for a first portion of a signal supplied to the encoder; and performing a second, different encoding rate control process for a second, different portion of the signal, wherein the first encoding rate control process calculates an average encoding rate based on encoding rates at a plurality of times, determines whether the calculated average encoding rate is greater than an upper value or less than a lower value and controls the encoding rate based on the determination, and the second encoding rate control process calculates an average encoding rate based on encoding rates at a plurality of times, determines into which of two or more rate ranges the calculated average rate falls and controls the encoding rate based on the determination.

8. A method according to claim 7, wherein the first signal portion temporally precedes the second signal portion.

9. A method according to claim 7, wherein the first signal portion is a predetermined number of groups of pictures.

10. A method according to claim 7, wherein the second encoding rate control process determines a rate of change of the encoding rate and further controls the encoding rate based on the determination.

* * * * *